US012380128B2

(12) United States Patent
Shah et al.

(10) Patent No.: US 12,380,128 B2
(45) Date of Patent: Aug. 5, 2025

(54) SYSTEMS AND METHODS FOR DATA SYNCHRONIZATION AND REPLICATION IN DISTRIBUTED NETWORKS

(71) Applicant: BANK OF AMERICA CORPORATION, Charlotte, NC (US)

(72) Inventors: Vinit Shah, Charlotte, NC (US); Pratap Dande, Saint Johns, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/504,273

(22) Filed: Nov. 8, 2023

(65) Prior Publication Data

US 2025/0147979 A1  May 8, 2025

(51) Int. Cl.
| | |
|---|---|
| *G06F 16/00* | (2019.01) |
| *G06F 9/48* | (2006.01) |
| *G06F 11/14* | (2006.01) |
| *G06F 16/27* | (2019.01) |

(52) U.S. Cl.
CPC .......... *G06F 16/27* (2019.01); *G06F 9/4881* (2013.01); *G06F 11/1464* (2013.01); *G06F 2201/805* (2013.01)

(58) Field of Classification Search
None
See application file for complete search history.

(56) References Cited

U.S. PATENT DOCUMENTS

| | | | |
|---|---|---|---|
| 2013/0007506 A1* | 1/2013 | Jain ..................... | G06F 11/1484 714/4.12 |
| 2023/0195577 A1* | 6/2023 | Darnell ............... | G06F 11/2048 714/15 |
| 2023/0205647 A1* | 6/2023 | Sharma ............... | G06F 11/1464 714/15 |
| 2023/0393958 A1* | 12/2023 | Chipman ............. | G06F 16/27 |

* cited by examiner

*Primary Examiner* — Farhan M Syed
(74) *Attorney, Agent, or Firm* — Moore & Van Allen PLLC; Michael M. McCraw (57) ABSTRACT

Systems, methods, and computer program products are provided herein for data synchronization and replication in distributed networks. An example method includes monitoring performance of operations on a source computing cluster that are associated with one or more applications and replicating data entries associated with the operations on a data recovery computing cluster communicably coupled with the source computing cluster. The method further includes determining an outage condition associated with the source computing cluster and determining a first operation whose execution is pending on the source computing cluster. The first operation also include first execution characteristics defining instructions for performance of the first operation as related to at least a first application. The method also include executing the first operation on the data recovery computing cluster based on the one or more first execution characteristics.

20 Claims, 7 Drawing Sheets

SYSTEMS AND METHODS FOR DATA SYNCHRONIZATION AND REPLICATION IN DISTRIBUTED NETWORKS

TECHNOLOGICAL FIELD

Example embodiments of the present disclosure relate generally to distributed networks and, more particularly, to systems and methods for data synchronization and replication in these network implementations.

BACKGROUND

Electronic systems, communication systems, and/or other distributed networks may be formed of various computing devices that are associated with a plurality of applications. These applications may include various operations, jobs, etc. that may be performed by the various computing devices that form the example network. Applicant has identified a number of deficiencies and problems associated with conventional systems and associated methods. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided herein for data synchronization and replication. In one aspect, a system for data synchronization and replication in distributed networks may include at least one non-transitory storage device and at least one processor coupled to the at least one non-transitory storage device. The processor may be configured to monitor performance of one or more operations on a source computing cluster where the one or more operations are associated with one or more application. The processor may replicate one or more data entries associated with the one or more operations on a data recovery computing cluster communicably coupled with the source computing cluster and determine an outage condition associated with the source computing cluster. The processor may further determine at least a first operation whose execution is pending on the source computing cluster.

The first operation may include one or more first execution characteristics defining instructions for performance of the first operation as related to at least a first application. The processor may further execute the first operation on the data recovery computing cluster based on the one or more first execution characteristics.

The processor may further execute the first operation on the data recovery computing cluster based on the one or more first execution characteristics.

In some embodiments, in executing the first operation on the data recovery computing cluster, the processor may be further configured to terminate execution of the first operation on the source computing cluster.

In some embodiments, the processor may be further configured to generate a user notification including the outage condition.

In some embodiments, the outage condition may be indicative of an operational failure of one or more computing components forming the source computing cluster.

In some embodiments, the outage condition may be indicative of a scheduled service operation associated with the source computing cluster.

In some embodiments, the one or more first execution characteristics may further include one or more data entries indicative of a second application linked to performance of the first operation for the first application.

In some further embodiments, the second application may be an upstream application of the first application that is configured to supply data to the first application. In such an embodiment, the processor may be further configured to redirect one or more connections between the second application and the source computing cluster to the data recovery computing cluster such that inputs from the second application are directed to the data recovery computing cluster.

Additionally or alternatively, in some embodiments, the second application may be a downstream application of the first application that is configured to receive data from the first application. In such an embodiments, the processor may be configured to redirect one or more connections between the source computing cluster and the second application to the data recovery computing cluster such that outputs from the data recovery computing cluster are directed to the second application.

In any embodiment, the one or more first execution characteristics may further include one or more data entries indicative of a priority associated with the first operation. In such an embodiment, the processor may be configured to determine an execution order queue for the data recovery computing cluster and execute the first operation on the data recovery computing cluster based on the priority of the first operation.

In another aspect, a computer program product for data synchronization and replication in distributed networks is provided. The computer program product may include a non-transitory computer-readable medium including code that, when executed, causes an apparatus to monitor performance of one or more operations on a source computing cluster where the one or more operations are associated with one or more applications, replicate one or more data entries associated with the one or more operations on a data recovery computing cluster communicably coupled with the source computing cluster, determine an outage condition associated with the source computing cluster, determine at least a first operation whose execution is pending on the source computing cluster where the first operation includes one or more first execution characteristics defining instructions for performance of the first operation as related to at least a first application, execute the first operation on the data recovery computing cluster based on the one or more first execution characteristics.

In another aspect, a method for data synchronization and replication in distributed networks is provided. The method may include monitoring performance of one or more operations on a source computing cluster where the one or more operations are associated with one or more applications, replicating one or more data entries associated with the one or more operations on a data recovery computing cluster communicably coupled with the source computing cluster, determining an outage condition associated with the source computing cluster, determining at least a first operation whose execution is pending on the source computing cluster where the first operation comprises one or more first execution characteristics defining instructions for performance of the first operation as related to at least a first application, and executing the first operation on the data recovery computing cluster based on the one or more first execution characteristics.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below. The features, functions, and advantages that are described herein may be achieved independently in various embodiments of the present disclosure or may be combined with yet other embodiments.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, this data may be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with or otherwise interact with an entity. As such, in some embodiments, the user may be an individual having past relationships, current relationships, and/or potential future relationships with an entity. In some embodiments, the user may be an employee (e.g., an associate, a project manager, an IT specialist, a manager, an administrator, an internal operations analyst, or the like) of the entity or enterprises affiliated with the entity. In some embodiments, the user may be a customer (e.g., individual, business, etc.) that transacts with the entity or enterprises associated with the entity. In some embodiments, the user may be a part of an applications team that supports the various applications that are performed by the computing clusters described herein. Although described hereinafter with reference to a user and associated user device interacting with an example system, the present disclosure contemplates that any number of users and associated user devices may interact with the systems described herein without limitation.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users. The present disclosure contemplates that the arrangement, presentation, organization, etc. of the user interfaces described herein may vary based upon the intended application of the system or the like. As described hereafter, the user interface may operate to present a user notification to a user indicative of an outage condition (e.g., operational failure, scheduled service, and/or the like) associated with a particular computing cluster that performs operations associated with one or more applications.

As used herein, an "engine," "module," or "service" may refer to core elements of an application, or part of an application that serves as a foundation for a larger piece of software and drives the functionality of the software. In some embodiments, an engine, module, or service (e.g., a microservice or the like) may be self-contained, but externally-controllable code that encapsulates powerful logic designed to perform or execute a specific type of function. In one aspect, an engine, module, or service may be underlying source code that establishes file hierarchy, input and output methods, and how a specific part of an application interacts or communicates with other software and/or hardware. The specific components of an engine or module may vary based on the needs of the specific application as part of the larger piece of software. In some embodiments, an engine, module, or service may be configured to retrieve resources created in other applications, which may then be ported into the engine for use during specific operational aspects of the engine. The engine, module, or service may be configurable to be implemented within any general purpose computing system. In doing so, the service may be configured to execute source code embedded therein to control specific features of the general purpose computing system to execute specific computing operations, thereby transforming the general purpose system into a specific purpose computing system.

It should also be understood that "operatively coupled," "communicably coupled" and/or the like as used herein, means that the components may be formed integrally with each other, or may be formed separately and coupled together. Furthermore, the components may be formed directly to each other, or to each other with one or more components located between the components that are operatively coupled together. Furthermore, the components may be detachable from each other, or they may permanently coupled together. Furthermore, operatively coupled components may mean that the components retain at least some freedom of movement in one or more directions or may be rotated about an axis (e.g., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, a system and an application, an accessing of stored data by one or more nodes of a computing cluster, a transmission of a requested task, or the like. As described hereinafter, an "interaction" between the system and one or more applications may be permissioned in that the ability for the system (e.g., one or more devices, subsystems, modules, etc.) to access a particular application may be controlled by permissions issued by this application. By way of a non-limiting example, a system of the present disclosure may be configured to ascertain the validity of account credentials received by the system (e.g., as part of a user account creation or otherwise). In such an example, an interaction may refer to the communication or transfer of data from a user device to a system providing account credentials.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As described above, electronic systems, communication systems, and/or other distributed networks may be formed of various computing devices that are associated with a plurality of applications. By way of example, in large data networks or ecosystems, a primary or source computing cluster (e.g., platform and/or the like) may be primarily responsible for executing operations (e.g., jobs or the like) associated with various applications. In operation, however, the source computing cluster may experience unexpected failure and/or scheduled outages (e.g., for maintenance activities or the like) such that the source computing cluster is incapable of performing necessary operations (e.g., jobs or the like). Conventional systems often fail to provide relevant mechanisms or techniques for addressing these outage conditions. For example, conventional implementations require user interaction to manually halt operations and manually reschedule these operations with different computing devices or systems. Given that application operations often have linked or otherwise related applications and/or application-specific configurations, the inability of conventional systems to efficiently address these outage conditions results in cascading inefficiencies that are particularly detrimental for critical application operations.

In order to solve these issues and others, embodiments of the present disclosure provide systems and methods for data synchronization and replication that ensure critical application operations are efficiently handled in the event of primary computing device outage. An example system may monitor performance of operations on a source computing cluster and replicate data entries associated with the operations on a data recovery computing cluster. In response to determining an outage condition for the source computing cluster, the system may identify at least a first operation whose execution is pending on the source computing cluster that includes first execution characteristics defining instructions for performance of the first operation as related to at least a first application. The system may execute the first operation on the data recovery computing cluster based on the one or more first execution characteristics and terminate execution of the first operation on the source computing cluster. The system may further operate to update various connections between applications and the source computing cluster to ensure continuity of data communication through various applications.

Example System and Circuitry Components

Figure 1A:
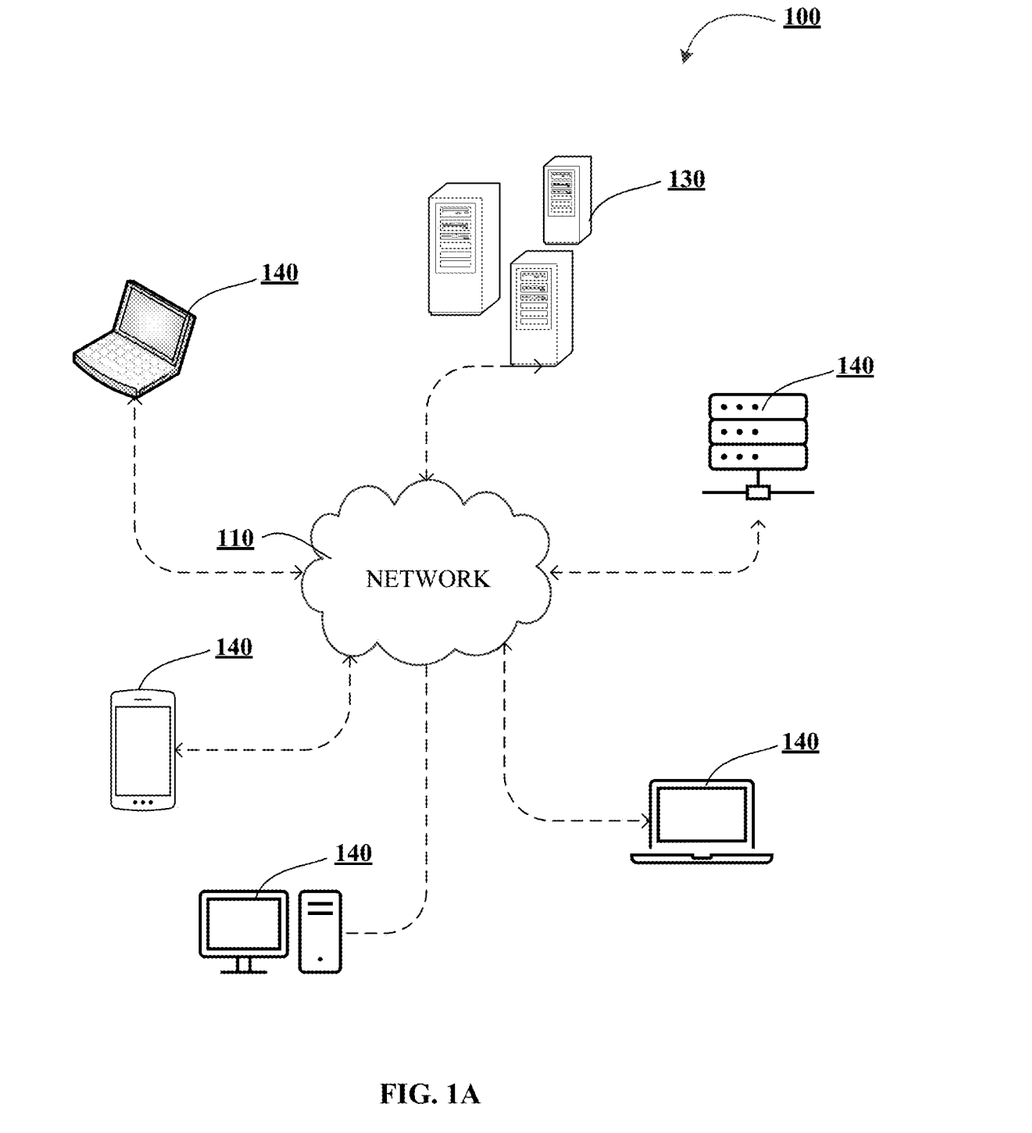
FIGS. 1A-1C illustrate technical components of an exemplary distributed computing environment for data synchronization and replication in accordance with one or more embodiments of the present disclosure.
Figure 1B:
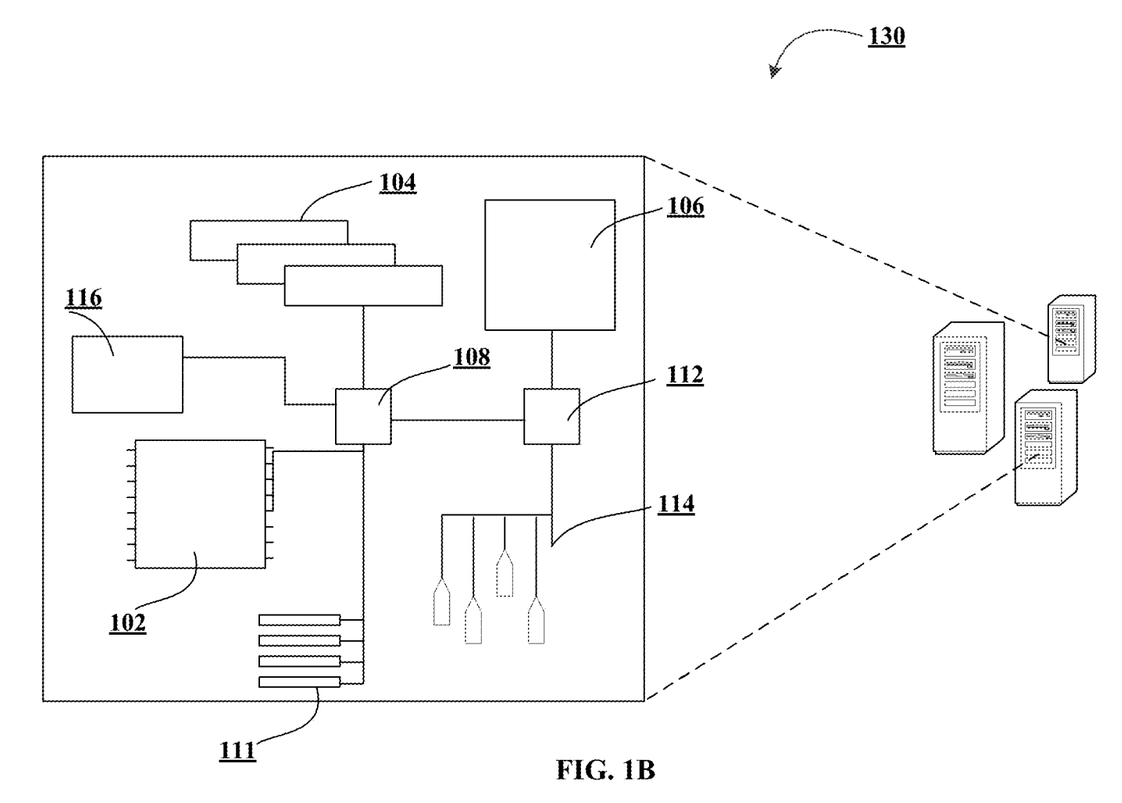
Figure 1C:
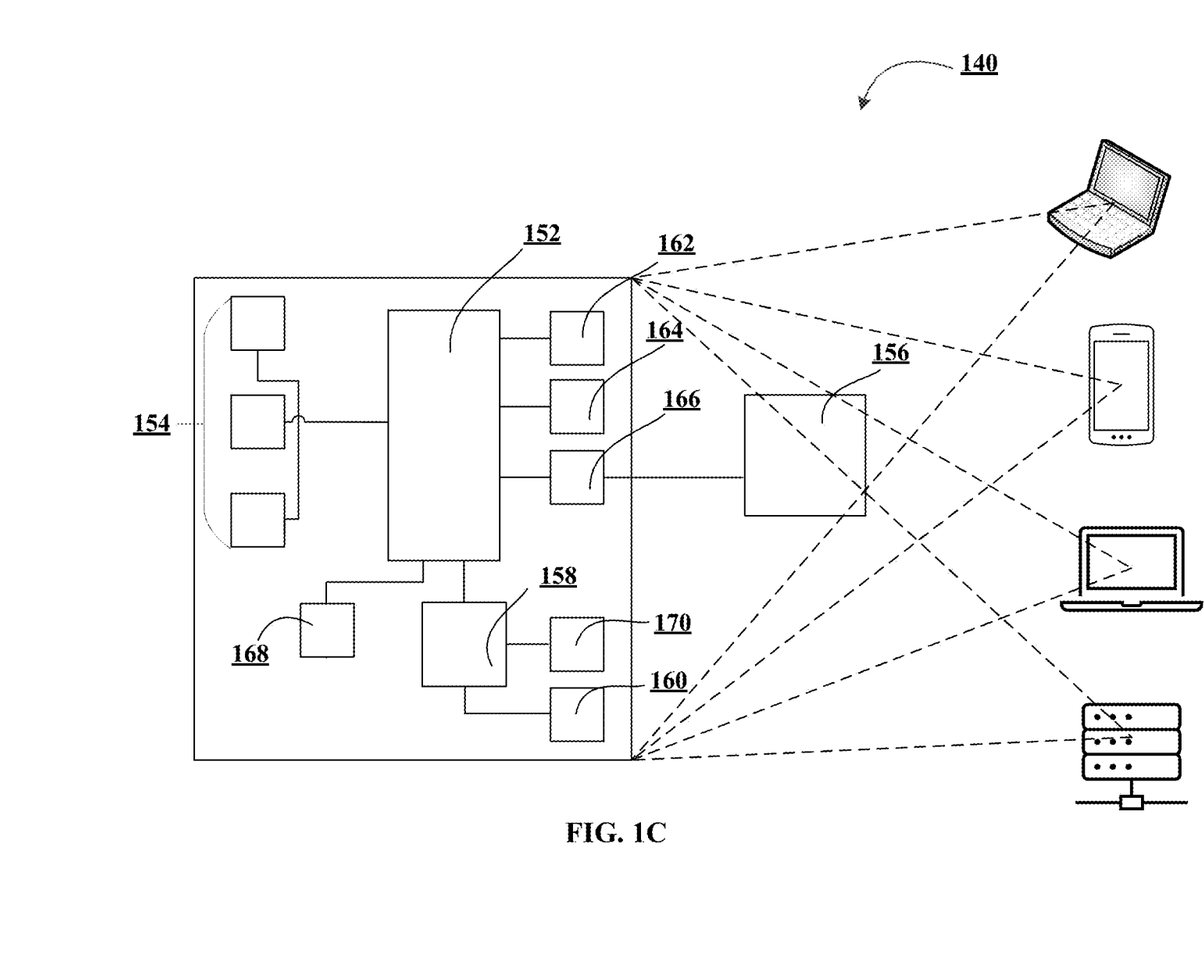

FIGS. 1A-1C illustrate technical components of an exemplary distributed computing environment for data synchronization and replication 100, in accordance with one or more embodiments of the present disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, the same or similar to system 130, with each system providing portions of the necessary operations (e.g., as a server bank, a group of blade servers, or a multi-processor system).

In some embodiments, the system 130 and the end-point device(s) 140 may define a client-server relationship in which the end-point device(s) 140 are remote devices that request and receive service from a centralized server (e.g., the system 130). In some other embodiments, the system 130 and the end-point device(s) 140 may have a peer-to-peer relationship in which the system 130 and the end-point device(s) 140 have the same abilities to use the resources available on the network 110. As opposed to relying upon a central server (e.g., system 130) that acts as the shared drive, each device that is connected to the network 110 acts as the server for the files stored thereon.

The system 130 may represent various forms of servers, such as web servers, database servers, file server, or the like, various forms of digital computing devices, such as laptops, desktops, video recorders, audio/video players, radios, workstations, virtual reality devices, augmented reality device, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, virtual reality devices, augmented reality device, and/or the like, electronic telecommunications device (e.g., an automated teller machine (ATM)), and/or edge devices such as routers, routing switches, integrated access devices (IAD), computing clusters, and/or the like.

The network 110 may be a distributed network that is spread over different networks. This provides a single data communication network that may be managed jointly or separately by each network. In addition to shared communication within the network, the distributed network may also support distributed processing. The network 110 may be a form of digital communication network, such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

As described hereinafter with reference to FIG. 2, the system 130 may comprise or be communicably coupled with various computing clusters (e.g., source computing cluster 200, data recovery (DR) computing cluster 210, etc.) each of which include various subsystems, applications, services, products, devices etc. that are collectively referred to herein as "services" or "microservices." Each of these computing clusters 200, 210 may include the components, devices, circuitry, etc. described herein with reference to the system 130 and/or end-point device 140 of FIGS. 1A-1C. Said differently, the functionality or operations performed by each of the computing clusters of the present disclosure may leverage any of the necessary structure, mechanisms, circuitry, etc. described herein, and each computing cluster may, in some embodiments, include distinct structures, mechanisms, circuitry, etc. for performing its associated operations. In some embodiments, the operations described herein may be performed, alone or in part, by the source computing cluster 200 such that the described processor performing the operations of FIGS. 3-5 refers to a processor of the source computing cluster 200. Additionally or alternatively, in some embodiments, the operations described herein may be performed, alone or in part, by the DR computing cluster 210 such that the described processor performing the operations of FIGS. 3-5 refers to a processor of the DR computing cluster 210.

It is to be understood that the structure of the distributed computing environment and its components, connections and relationships, and their functions, are meant to be exemplary only and are not meant to limit implementations of the embodiments of the present disclosure. In one example, the distributed computing environment 100 may include more, fewer, or different components. In another example, some or all of the portions of the distributed computing environment 100 may be combined into a single portion, or all of the portions of the system 130 may be separated into two or more distinct portions. Furthermore, as described hereafter with reference to FIG. 2, operations associated with various applications may be performed by the services or microservices of the source computing cluster 200 and/or the DR computing cluster 210.

FIG. 1B illustrates an exemplary component-level structure of the system 130, in accordance with one or more embodiments of the present disclosure. As shown in FIG. 1B, the system 130 may include a processor 102, memory 104, input/output (I/O) device 116, and/or a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. As described above, these subsystems (or any portion of the larger system 130) may include various distributed service systems.

The processor 102 may process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 may be capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102. In some embodiments, as described hereinafter, the generated interaction object formed of various service system specific data trace objects may be stored by a data trace specific database structure (e.g., separate from a primary memory location for application operations, outcomes, etc.). As such, the present disclosure contemplates that such a data trace specific database structure may include the same or substantially the same functionality, circuitry, components, devices, etc. of the memory 104 and/or storage device 106.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and/or to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with one or more embodiments of the present disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a Microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user (e.g., an actionable notification or the like). The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 may be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, virtual reality environments, and/or any of the components described herein. To this end, the system 130 may trigger an authentication subsystem that may require the user (or process) to provide authentication credentials to determine whether the user (or process) is eligible to access the protected resources. As described hereinafter, the embodiments, of the present disclosure may evaluate tokenized datasets formed at least in part by account credentials. As such, once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, VR/AR devices, and/or a speaker. Similarly, in instances in which the account credentials are determined to be fabricated or otherwise invalid, the authentication subsystem precludes access to the user (or process).

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here may be realized in digital electronic circuitry, integrated circuitry, specially designed ASICs (application specific integrated circuits), computer hardware, firmware, software, and/or combinations thereof.

Example Computing Clusters

Figure 2:
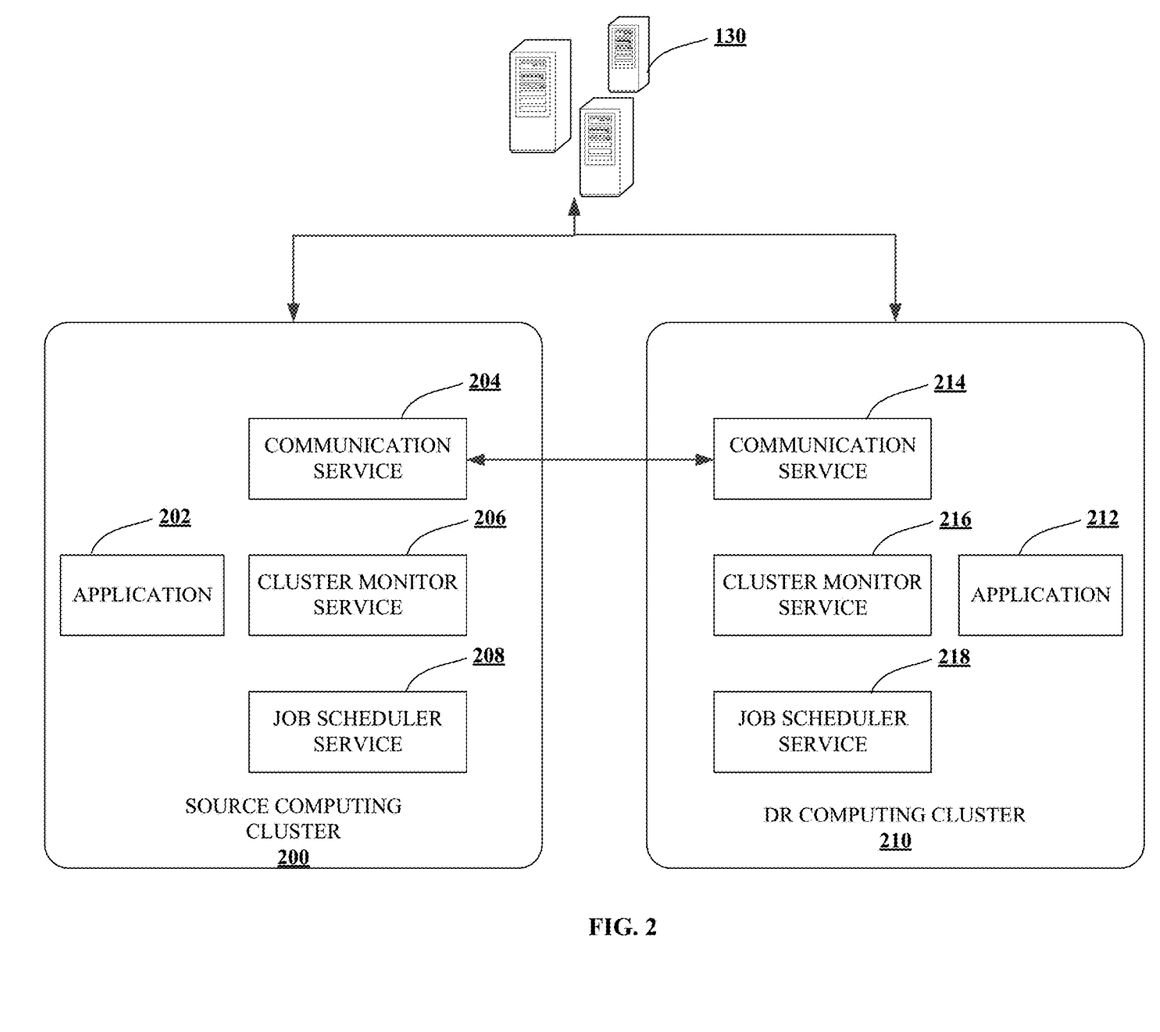
FIG. 2 illustrates example computing clusters comprising and/or for use with the technical components of FIGS. 1A-1C in accordance with one or more embodiments of the present disclosure.

FIG. 2 illustrates example computing clusters that may be used by the embodiments described herein. As shown, the system 130 may, for example, be communicably coupled with a source computing cluster 200 and a data recovery (DR) computing cluster 210. As described hereinafter with reference to the operations of FIGS. 3-5, the source computing cluster 200 may refer to the collection of computing devices that are primarily configured to perform various operations (e.g., jobs or the like) that may be associated with various applications. As also described hereafter, the DR computing cluster 210 may refer to the collection of computing devices that are configured to perform various operations (e.g., jobs or the like) that may be associated with various applications in instances in which the source computing cluster 200 is incapable of effectively executing these operations.

As shown, the source computing cluster 200 and DR computing cluster 210 may be associated with at least an application 202, 212, a communication service 204, 214, a cluster monitor service 206, 216, and a job scheduler service 208, 218. The applications 202, 212 may refer to any application associated with the source computing cluster 200, the DR computing cluster 210, and/or the system 130 without limitation and may have associated operations (e.g., jobs or the like) that are performed in order to achieve the various outcomes associated with these applications 202, 212. The present disclosure contemplates that the applications described herein may refer to any collection of operations, jobs, etc. based on the intended implementation of the system 130.

Figure 3:
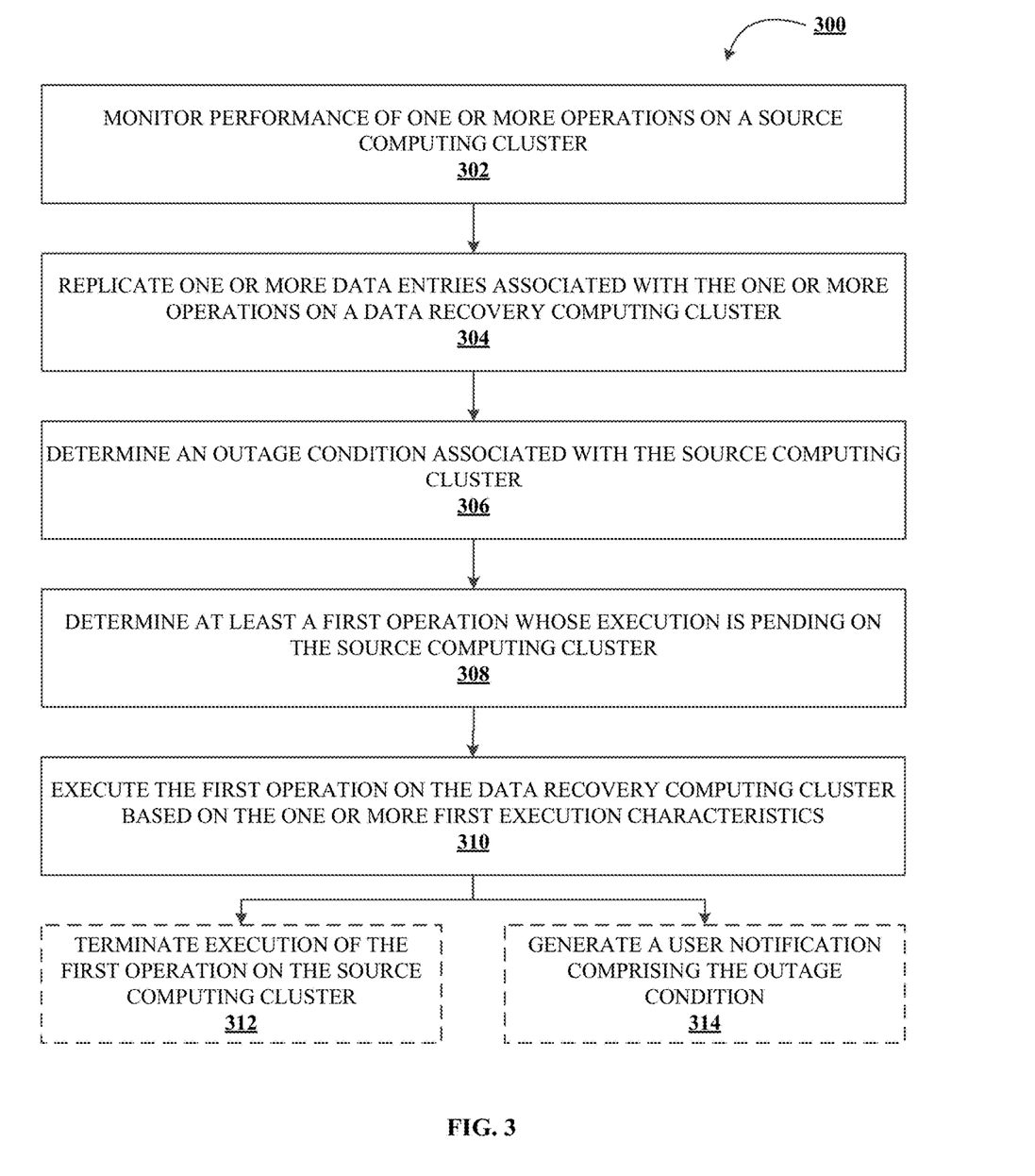
FIG. 3 illustrates a method for data synchronization and replication in distributed networks in accordance with one or more embodiments of the present disclosure.
Figure 4:
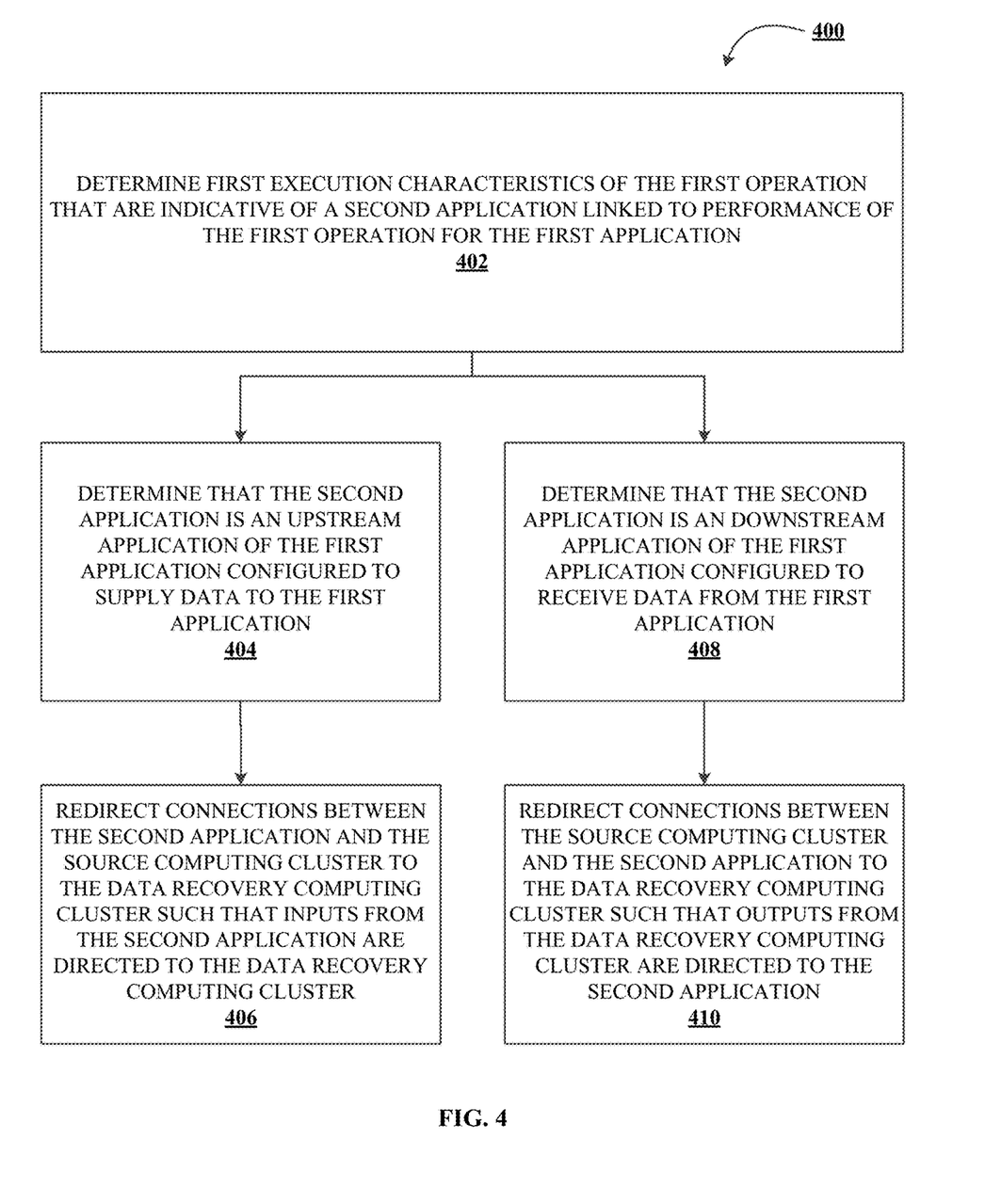
FIG. 4 illustrates a method for communication redirection in accordance with one or more embodiments of the present disclosure.
Figure 5:
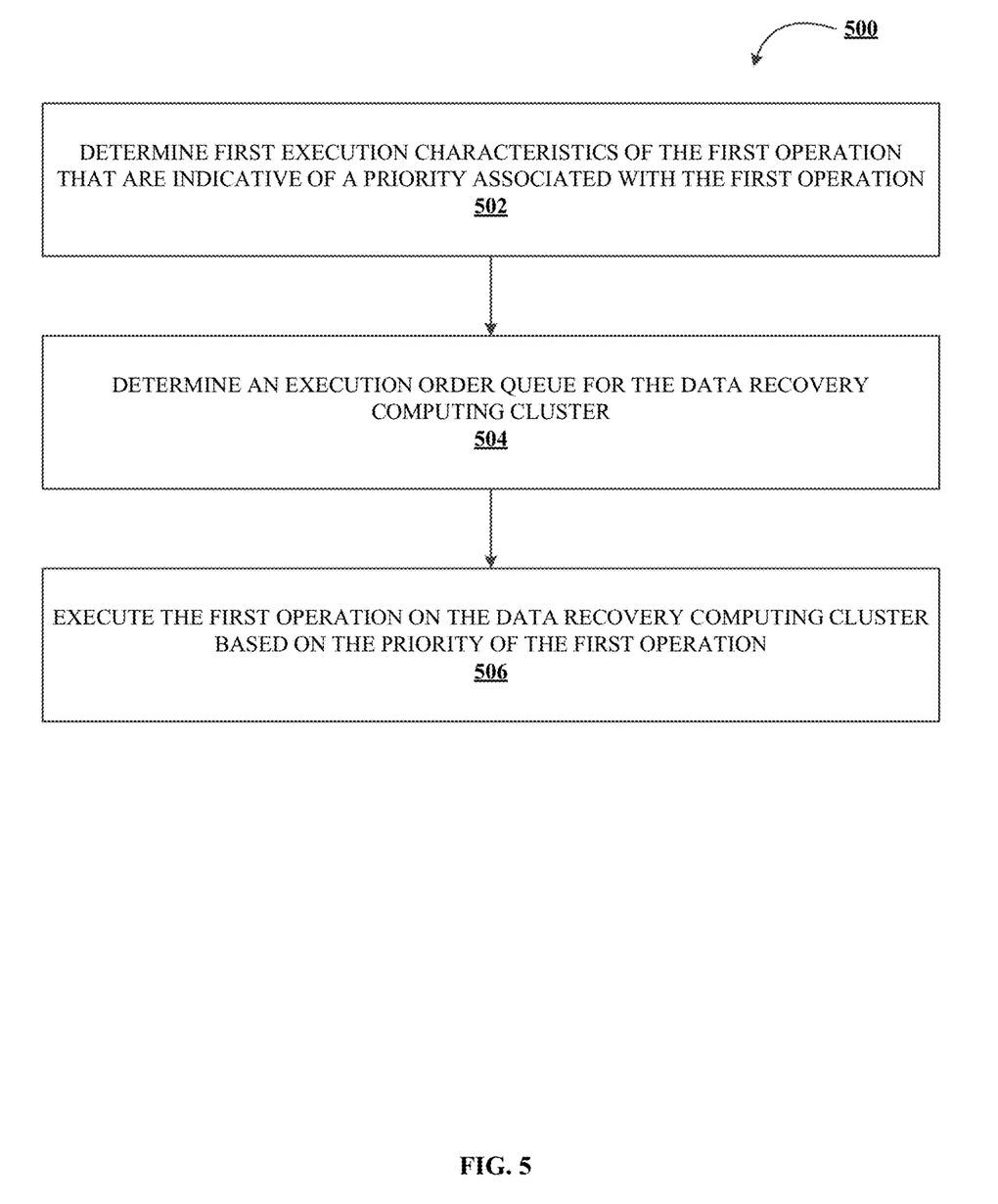
FIG. 5 illustrates a method for operation priority determinations in accordance with one or more embodiments of the present disclosure.

As described hereafter with reference to the operations of FIG. 3-5, the communication services 204, 214 may operate to establish and maintain connectivity between the source computing cluster 200 and the DR computing cluster 210. By way of a nonlimiting example, the computing services 204, 214 may use a bidirectional communication protocol (e.g., remote procedure call (RPC) or the like). This microservice (e.g., the communication services 204, 214) may further operate to schedule, execute, and transfer data entries between the source computing cluster 200 and the DR computing cluster 210, such as data entries relevant to executing operations on the DR computing cluster 210. The present disclosure contemplates that the communication services 204, 214 may comprise or otherwise access any of the computing components, circuitry components, etc. described above with reference to FIGS. 1A-1C.

With continued reference to FIG. 2, the computing clusters 200, 210 may further include cluster monitor services 206, 216. As described hereafter with reference to the operations of FIG. 3-5, the cluster monitor services 206, 216 may operate to determine outage conditions (e.g., failures, scheduled maintenance, etc.) associated with the source computing cluster 200. In some implementations, the cluster monitor services 206, 216 may include dynamically configurable rules that operate as trigger events when a configured threshold is reached, or a service failure is detected on the source computing clusters. This microservices (e.g., the cluster monitor services 206, 216) may also operate to generate a user notification associated with the outage condition. The present disclosure contemplates that the cluster monitor services 206, 216 may comprise or otherwise access any of the computing components, circuitry components, etc. described above with reference to FIGS. 1A-1C.

As described hereafter with reference to the operations of FIG. 3-5, the job scheduler services 208, 218 may operate to collect operations that are pending (e.g., running, being executed, etc.) on the source computing cluster 200 and reschedule the appropriate jobs on the DR computing cluster 210. This microservice (e.g., the job scheduler services 208, 218) may operate to accumulates metadata or other data entries related to the operations and any linked or otherwise dependent resources (e.g., input datafiles, operation configurations, related application, etc. The job scheduler services 208, 218 may further generate an operation script for execution on the DR computing cluster 210. The present disclosure contemplates that the job scheduler services 208, 218 may comprise or otherwise access any of the computing components, circuitry components, etc. described above with reference to FIGS. 1A-1C. Although described herein with reference to particular microservices in FIG. 2, the present disclosure contemplates that any type, number, configuration, etc. of microservices may be used by the computing clusters 200, 210 based on the intended application of the system 130.

Example Methods Data Synchronization and Replication

FIG. 3 illustrates a flowchart containing a series of operations for data synchronization and replication in distributed networks (e.g., method 300). The operations illustrated in FIG. 3 may, for example, be performed by, with the assistance of, and/or under the control of an apparatus (e.g., system 130, end-point devices 140, source computing cluster 200, DR computing cluster 210, etc.), as described above. In this regard, performance of the operations may invoke one or more of the components described above with reference to FIGS. 1A-2 (e.g., processor 102, processor 152, communication service 204, 214, cluster monitor service 206, 216, job scheduler service 208, 218, etc.).

As shown in operation 302, the system 130 may be configured to monitor performance of one or more operations on a source computing cluster 200. As described above, the source computing cluster 200 may operate as the collection of computing devices that is primarily responsible for executing operations, such as operations that are associated with various applications. As described above, the nature, form, type, etc. of the applications that are associated with the source computing cluster 200 and/or system 130 may vary based on the intended implementation of the source computing cluster 200 and/or the system 130. As such, the operations that are monitored at operation 302 may refer to operations of one or more applications of any type. In some instances, various operations may be associated with the same application (e.g., a first application). In other instances, various operations may be associated with different applications (e.g., a first application, a second application, . . . an $N^{th}$ application).

The system 130 may, in some embodiments, be configured to actively monitor the performance of the operations on the source computing cluster 200 via the example communication services 204, 214 and/or the cluster monitor services 206, 216. For example, the system 130 may, via these microservices or the like, sample data entries associated with the one or more operations on the source computing cluster 200. In other embodiments, the source computing cluster 200 may periodically (e.g., based on a determined sampling frequency or the like) transmit data entries associated with the operations performed on the source computing cluster 200 to the system 130. The present disclosure contemplates that the monitoring of the operations executed on the source computing cluster 200 may occur via any mechanism, device, technique, etc. based on the intended implementation of the system 130, the source computing cluster 200, and/or the like.

Thereafter, as shown in operation 304, the system 130 may be configured to replicate one or more data entries associated with the one or more operations on a data recovery computing cluster 210 communicably coupled with the source computing cluster 200. As described above and hereafter, the embodiments of the present disclosure may operate to efficiently execute operations in instances in which a source computing cluster 200 is incapable of executing these operations. In order to reduce the time required to execute an operation on the DR computing cluster 210 as described hereafter, the system 130 may operate to replicate, mirror, or otherwise copy data entries associated with the operation to the DR computing cluster 210 prior to an outage of the source computing cluster 200. The present disclosure contemplates that the system 130 may leverage any mechanism, technique, device, etc. to replicate the data (e.g., one or more data entries) associated with the operations of the source computing cluster 200 on the DR computing cluster 210.

In some embodiments, the system 130 may operate to replicate each data entry that is generated or otherwise exists in the source computing cluster 200. In other embodiments, the system 130 may selectively replicate data entries associated with only particular operations (e.g., a first operation or the like) that are performed by the source computing cluster 200. In such an embodiment, for example, the system 130 may identify or otherwise determine operations (e.g., jobs or the like) and/or applications that are critical (e.g., having a higher priority or criticality relative other operations/applications) and replicate these data entries alone. Additionally or alternatively, in some embodiments, the system 130 may operate to determine operations and/or applications that are critical as described above and prioritize replication of these data entries to the DR computing cluster 210 relative other data entries.

Thereafter, as shown in operation 306, the system 130 may determine an outage condition associated with the source computing cluster 200. In some embodiments, the outage condition may be indicative of an operational failure of one or more computing components forming the source computing cluster 200. By way of example, the source computing cluster 200 may leverage various memory devices, processor, communication interfaces, and/or the like, such as those described above with reference to FIGS. 1A-1C. During operation, however, one or more of these components may fail, disconnect, overheat, or otherwise be incapable of performing its associated processes. The system 130 may, in such an instance, determine an outage condition for the source computing cluster 200.

In some embodiments, the outage condition may be indicative of a scheduled service operation associated with the source computing cluster 200. By way of example, the computing components that form the source computing cluster 200 may require maintenance, upgrading, servicing, and/or the like. The system 130 may receive an indication of such a scheduled service operation and determine an outage condition for the source computing cluster 200 during these service operations. In some embodiments, the system 130 may receive an indication from the source computing cluster 200 or another entity indicating the scheduled service operation. In some embodiments, the system 130 may, during monitoring performance of the operations on the source computing cluster 200 at operation 302, also monitor various communications to the source computing cluster 200, performance metrics of the source computing cluster, and/or the like in order to predict a schedule maintenance for the source computing cluster 200. By way of a nonlimiting example, the system 130 may determine a decrease in a particular performance metric of one or more computing components of the source computing cluster 200 and predict a scheduled maintenance or service operations for the computing components that may result in an outage condition.

Although described herein with reference to operational failure and scheduled service as example outage conditions, the present disclosure contemplates that an outage condition for the source computing cluster 200 may refer to any characteristics, condition, etc. of the source computing cluster 200 that inhibits performance of the one or more operations. By way of example, in some embodiments, an outage condition may be determined in an instance in which the source computing cluster 200 is incapable of executing one or more operations for an application within a determine time period. In some instances, for example, the source computing cluster 200 may be overburdened such that the number or size of operations to be performed by the source computing cluster 200 exceeds to operational capacity of the source computing cluster 200. In such an embodiment, the system 130 may determine an outage condition with respect to the particular operations and associated application. The present disclosure contemplates that the system 130 may determine an outage condition for any condition, status, etc. of the source computing cluster 200 without limitation.

Thereafter, as shown in operation 308, the system 130 may be configured to determine at least a first operation whose execution is pending on the source computing cluster 200. By way of continued example, the source computing cluster 200 may be primarily responsible for executing operations associated with a plurality of applications. As such, the source computing cluster 200 may include a queue or other similar organizational system for scheduling/ordering operations for execution. In response to determining the outage condition for the source computing cluster 200 as described above with reference to operation 306, the system 130 may determine that the operations that are queued or otherwise pending for execution by the source computing cluster 200 will not be executed by the source computing cluster 200. By way of a nonlimiting example, the system 130 may determine at least a first operation whose execution is pending on the source computing cluster 200. Although described hereinafter with reference to a first operation and associated first application, the present disclosure contemplates that the operations described herein may be applicable to any number of operations and applications.

The first operation may further include one or more first execution characteristics defining instructions for performance of the first operation as related to at least a first application. By way of example, the performance of the first operation may require various application configurations, input datafiles, output connections, operation scripts, and/or the like. The one or more first execution characteristics may include data entries indicative of these characteristics and may instruct the system 130 as to how the first operation is to be executed with respect to the first application. In some embodiments, the execution of the first operation may be application specific in that the operation script for the first operation differs depending on the associated application. Similarly, the execution of the first operation may be cluster specific in that the operation script for the first operations differs depending on the associated cluster (e.g., the source computing cluster 200 or the DR computing cluster 210). As such, the one or more first execution characteristics of the first operation may define instructions for executing the first operation that account for these differences in execution.

As described hereinafter with reference to FIG. 4, in some embodiments, the one or more data entries of the first execution characteristics may be indicative of a second application linked to performance of the first operation for the first application. By way of example, the first operation and associated first application may transmit and/or receive data from other applications (e.g., an example second application). As such, the first execution characteristics may define the way in which the inputs or outputs associated with the first operation are related to other applications. Although described hereinafter with reference to a second application, the present disclosure contemplates that the first operation and first application may be related to any number of other applications or operations without limitation. As described hereinafter with reference to FIG. 5, in some embodiments, the one or more first execution characteristics further comprise one or more data entries indicative of a priority associated with the first operation. As described above, the criticality of any particular operation or application may vary based on the implementation of the system 130, and, for example, the clusters 200, 210 described herein may use a queue or other similar organizational system for scheduling/ordering operations for execution. In order to determine the order in which the first operation is executed relative to other operations, the first execution characteristics may be indicative of a priority for the first operation. The present disclosure contemplates that the first execution characteristics may include data entries associated with any parameter, attribute, aspect, quality, and/or the like of the first operation and/or first application.

Thereafter, as shown in operation 310, the system 130 may be configured to execute the first operation on the data recovery (DR) computing cluster 210 based on the one or more first execution characteristics. In order to execute the first operation, the source computing cluster 200, via the microsystems described above, may transmit the necessary data (e.g., as defined by the first execution characteristics) to the DR computing cluster 210. Additionally or alternatively, the DR computing cluster 210 may operate to generate the necessary data for executing the first operation. In some embodiments, as shown in operation 312, the system may terminate execution of the first operation on the source computing cluster 200. By way of example, the system 130 may be configured to transmit instructions to the source computing cluster 200 to terminate the first operation to prevent unnecessary performance of the first operation by the source computing cluster 200, such as at a later time at which the outage condition has been resolved. In some embodiments, termination of the first operation on the source computing cluster 200 may occur prior to execution of the first operation on the DR computing cluster 200.

In any embodiment, as show in operation 314, the system 130 may be configured to generate a user notification comprising the outage condition. As described above, the system 130 may be configured to cause presentation of a user interface for review by one or more users associated with the system 130. The user notification of the outage condition may, for example, be presented to applications-related user of the system 130 so as to identify and monitor the status of the outage condition of the source computing cluster 200. The present disclosure contemplates that the user notification may include data associated with any information based on the implementation of the system 130, the source computing cluster 200, and/or the DR computing cluster 210. By way of a nonlimiting example, the user notification may include data entries indicative of the operations and applications that are executed by the DR computing cluster 210, the execution time and return status for each operation, and/or any other metrics associated with the transfer of operations from the source computing cluster 200 to the DR computing cluster 210.

FIG. 4 illustrates a flowchart containing a series of operations for communication redirection (e.g., method 400). The operations illustrated in FIG. 4 may, for example, be performed by, with the assistance of, and/or under the control of an apparatus (e.g., system 130, end-point devices 140, source computing cluster 200, DR computing cluster 210, etc.), as described above. In this regard, performance of the operations may invoke one or more of the components described above with reference to FIGS. 1A-2 (e.g., processor 102, processor 152, communication service 204, 214, cluster monitor service 206, 216, job scheduler service 208, 218, etc.).

As shown in operation 402, the system 130 may be configured to determine that the first execution characteristics of the first operation are indicative of second application linked to performance of the first operation for the first application. As described above, the first operation and associated first application may transmit and/or receive data from other applications (e.g., an example second application). As such, the first execution characteristics may define the way in which the inputs or outputs associated with the first operation are related to other applications. Although described hereinafter with reference to a second application, the present disclosure contemplates that the first operation and first application may be related to any number of other applications or operations without limitation.

In some embodiments, as shown in operation 404, the system 130 may be configured to determine that the second application is an upstream application of the first application that is configured to supply data to the first application. By way of example, the first operation and associated first application may be configured to receive data inputs from a plurality of sources. One such data input source may be an example second application that primarily supplies data to the source computing cluster 200. Given that the source computing cluster 200 is, due to the determined outage condition described above, incapable of executing the first operation, the data inputs from the second application that are required to execute the first operation must instead be provided to the DR computing cluster 210. As such, and as shown in operation 406, the system 130 may be configured to redirect one or more connections between the second application and the source computing cluster to the data recovery computing cluster. The redirection at operation 406 may be such that inputs from the second application are directed to the data recovery computing cluster 210 as opposed to the source computing cluster 200. In doing so, the system 130 may operate to ensure that valid data transmission paths between system application remain when the first operation is moved to the DR computing cluster 210 for execution. The present disclosure contemplates that, once the outage condition for the source computing cluster 200 is resolved, the connections between the second application and the source computing cluster 200 may be reverted.

Additionally or alternatively, in some embodiments, as shown in operation 408, the system 130 may be configured to determine that the second application is a downstream application of the first application that is configured to receive data from the first application. By way of example, the first operation and associated first application may be configured to transmit data outputs to a plurality of destinations. One such data output may be to an example second application that primarily receives data from the source computing cluster 200. Given that the source computing cluster 200 is, due to the determined outage condition described above, incapable of executing the first operation, the data outputs from the first operation and first application are executed on the DR computing cluster 210, and the outputs of the first operation may be provided to the second application from the DR computing cluster 210. As such, and as shown in operation 410, the system 130 may be configured to redirect one or more connections between the source computing cluster 200 and the second application to the data recovery computing cluster 210. The redirection at operation 408 may be such that outputs from the DR computing cluster 210 are directed to the second application. The present disclosure contemplates that, once the outage condition for the source computing cluster 200 is resolved, these connections between the second application and the source computing cluster 200 may be reverted.

FIG. 5 illustrates a flowchart containing a series of operations for operation priority determinations (e.g., method 500). The operations illustrated in FIG. 5 may, for example, be performed by, with the assistance of, and/or under the control of an apparatus (e.g., system 130, endpoint devices 140, source computing cluster 200, DR computing cluster 210, etc.), as described above. In this regard, performance of the operations may invoke one or more of the components described above with reference to FIGS. 1A-2 (e.g., processor 102, processor 152, communication service 204, 214, cluster monitor service 206, 216, job scheduler service 208, 218, etc.).

As shown in operation 502, in some embodiments, the system 130 may be configured to determine that the one or more first execution characteristics further include one or more data entries indicative of a priority associated with the first operation. As described above, the criticality of any particular operation or application may vary based on the implementation of the system 130, and, for example, the clusters 200, 210 described herein may use a queue or other similar organizational system for scheduling/ordering operations for execution. In order to determine the order in which the first operation is executed relative to other operations, the first execution characteristics may be indicative of a priority for the first operation. The present disclosure contemplates that the form of the priority for the first operation may vary based on the number and/or type of operations to be executed by the DR computing cluster 210.

Thereafter, as shown in operations 504 and 506, the system 130 may be configured to determine an execution order queue for the DR computing cluster 210 and execute the first operation on the DR computing cluster 210 based on the priority of the first operation, respectively. By way of example, the DR computing cluster 210 may receive a plurality of operations for execution due to the outage condition for the source computing cluster 200. Each of these operations, including the first operation, may include execution characteristics that indicate the priority for the respective operations. In some embodiments, the priority may refer to a relative positioning within the queue for operations (e.g., the first operation must be executed before the second operation). In other embodiments, the priority may refer to an absolute position within the queue for operations (e.g., the first operation must be executed before all operations). The present disclosure contemplates that the priority determinations at operation 504 may refer to any determination regarding the positioning of the operation within the queue. Following the determination of the associated priority for the first operation, the DR computing cluster 210 may executed the first operation based on its associated priority. As would be evident to one of ordinary skill in the art in light of the present disclosure, the priority for the operations to be executed by the DR computing cluster 210 may dynamically vary in response to subsequent operations received at the DR computing cluster 210. As such the queue of operations may similarly dynamically change during operation.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that may direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments may be configured without departing from the scope and spirit of the disclosure. Therefore, it is to be understood that, within the scope of the appended claims, the disclosure may be practiced other than as specifically described herein.

What is claimed is:

1. A system for data synchronization and replication in distributed networks, the system comprising:
   at least one non-transitory storage device; and
   at least one processor coupled to the at least one non-transitory storage device, wherein the at least one processor is configured to:
   monitor performance of one or more operations executed on a source computing cluster by one or more computing devices forming the source computing cluster, wherein the one or more operations are associated with one or more applications including at least a first application whose operations are executed on the source computing cluster and a second application linked to performance of the first application on the source computing cluster;
   replicate one or more data entries associated with the one or more operations on a data recovery computing cluster communicably coupled with the source computing cluster;
   determine an outage condition associated with the source computing cluster;
   determine at least a first operation of the first application the execution of which is pending on the source computing cluster, wherein the first operation comprises one or more first execution characteristics defining instructions for performance of the first operation of the first application;
   execute the first operation on the data recovery computing cluster based on the one or more first execution characteristics; and
   modify one or more connections associated with the second application based on the execution of the first operation on the data recover computing cluster.

2. The system of claim 1, wherein, in executing the first operation on the data recovery computing cluster, the processor is further configured to terminate execution of the first operation on the source computing cluster.

3. The system of claim 1, wherein the processor is further configured to generate a user notification comprising the outage condition.

4. The system of claim 1, wherein the outage condition is indicative of an operational failure of the one or more computing components forming the source computing cluster.

5. The system of claim 1, wherein the outage condition is indicative of a scheduled service operation associated with the source computing cluster.

6. The system of claim 1, wherein the second application is an upstream application of the first application that is configured to supply data to the first application, the processor further configured to:
 redirect the one or more connections between the second application and the source computing cluster to the data recovery computing cluster such that inputs from the second application are directed to the data recovery computing cluster.

7. The system of claim 1, wherein the second application is a downstream application of the first application that is configured to receive data from the first application, the processor further configured to:
 redirect the one or more connections between the source computing cluster and the second application to the data recovery computing cluster such that outputs from the data recovery computing cluster are directed to the second application.

8. The system of claim 1, wherein the one or more first execution characteristics further comprise one or more data entries indicative of a priority associated with the first operation, the processor further configured to:
 determine an execution order queue for the data recovery computing cluster; and
 execute the first operation on the data recovery computing cluster based on the priority of the first operation.

9. A computer program product for data synchronization and replication in distributed networks, the computer program product comprising a non-transitory computer-readable medium comprising code that, when executed, causes an apparatus to:
 monitor performance of one or more operations executed on a source computing cluster by one or more computing devices forming the source computing cluster, wherein the one or more operations are associated with one or more applications including at least a first application whose operations are executed on the source computing cluster and a second application linked to performance of the first application on the source computing cluster;
 replicate one or more data entries associated with the one or more operations on a data recovery computing cluster communicably coupled with the source computing cluster;
 determine an outage condition associated with the source computing cluster;
 determine at least a first operation of the first application the execution of which is pending on the source computing cluster, wherein the first operation comprises one or more first execution characteristics defining instructions for performance of the first operation of the first application;
 execute the first operation on the data recovery computing cluster based on the one or more first execution characteristics; and
 modify one or more connections associated with the second application based on the execution of the first operation on the data recover computing cluster.

10. The computer program product of claim 9, further comprising code that, when executed, causes the apparatus to terminate execution of the first operation on the source computing cluster.

11. The computer program product of claim 9, wherein the second application is an upstream application of the first application that is configured to supply data to the first application, the computing program product further comprising code that, when executed, causes the apparatus to:
 redirect the one or more connections between the second application and the source computing cluster to the data recovery computing cluster such that inputs from the second application are directed to the data recovery computing cluster.

12. The computer program product of claim 9, wherein the second application is a downstream application of the first application that is configured to receive data from the first application, the computing program product further comprising code that, when executed, causes the apparatus to:
 redirect the one or more connections between the source computing cluster and the second application to the data recovery computing cluster such that outputs from the data recovery computing cluster are directed to the second application.

13. The computer program product of claim 9, wherein the one or more first execution characteristics further comprise one or more data entries indicative of a priority associated with the first operation, the computing program product further comprising code that, when executed, causes the apparatus to:
 determine an execution order queue for the data recovery computing cluster; and
 execute the first operation on the data recovery computing cluster based on the priority of the first operation.

14. A method for data synchronization and replication in distributed networks, the method comprising:
 monitoring performance of one or more operations executed on a source computing cluster by one or more computing devices forming the source computing cluster, wherein the one or more operations are associated with one or more applications including at least a first application whose operations are executed on the source computing cluster and a second application linked to performance of the first application on the source computing cluster;
 replicating one or more data entries associated with the one or more operations on a data recovery computing cluster communicably coupled with the source computing cluster;
 determining an outage condition associated with the source computing cluster;
 determining at least a first operation of the first application the execution of which is pending on the source computing cluster, wherein the first operation comprises one or more first execution characteristics defining instructions for performance of the first operation of the first application;
 executing the first operation on the data recovery computing cluster based on the one or more first execution characteristics; and modifying one or more connections associated with the second application based on the execution of the first operation on the data recover computing cluster.

15. The method of claim 14, further comprising terminating execution of the first operation on the source computing cluster.

16. The method of claim 14, wherein the second application is an upstream application of the first application that is configured to supply data to the first application, the method further comprising:
redirecting the one or more connections between the second application and the source computing cluster to the data recovery computing cluster such that inputs from the second application are directed to the data recovery computing cluster.

17. The method of claim 16, wherein the second application is a downstream application of the first application that is configured to receive data from the first application, the method further comprising:
redirecting the one or more connections between the source computing cluster and the second application to the data recovery computing cluster such that outputs from the data recovery computing cluster are directed to the second application.

18. The computer program product of claim 9, further comprising code that, when executed, causes the apparatus to generate a user notification comprising the outage condition.

19. The computer program product of claim 9, wherein the outage condition is indicative of:
an operational failure of the one or more computing components forming the source computing cluster; or
a scheduled service operation associated with the source computing cluster.

20. The method according to claim 14, wherein the outage condition is indicative of:
an operational failure of the one or more computing components forming the source computing cluster; or
a scheduled service operation associated with the source computing cluster.

* * * * *